(12) United States Patent
Cromm et al.

(10) Patent No.: US 11,280,427 B2
(45) Date of Patent: Mar. 22, 2022

(54) VACUUM SAFETY VALVE

(71) Applicant: Pfeiffer Vacuum GmbH, Asslar (DE)

(72) Inventors: Thomas Cromm, Lollar (DE); Timo Lange, Pohlheim (DE)

(73) Assignee: PFEIFFER VACUUM GMBH, Asslar (DE)

( * ) Notice: Subject to any disclaimer, the term of this patent is extended or adjusted under 35 U.S.C. 154(b) by 50 days.

(21) Appl. No.: 16/390,124

(22) Filed: Apr. 22, 2019

(65) Prior Publication Data
US 2019/0331250 A1 Oct. 31, 2019

(30) Foreign Application Priority Data

Apr. 27, 2018 (EP) ..................................... 18169982

(51) Int. Cl.
*F16K 31/126* (2006.01)
*F16K 17/04* (2006.01)

(52) U.S. Cl.
CPC .......... *F16K 31/1262* (2013.01); *F16K 17/04* (2013.01)

(58) Field of Classification Search
CPC .............................. F16K 17/04; F16K 31/1262
See application file for complete search history.

(56) References Cited

U.S. PATENT DOCUMENTS

| 3,982,558 A * | 9/1976 | Ochs ................ G05D 16/0652 137/455 |
| 4,527,620 A * | 7/1985 | Pedersen ........... H01L 21/67103 165/80.5 |
| 4,752,445 A | 6/1988 | Zell |
| 4,903,938 A | 2/1990 | Nishizawa |
| 2015/0204456 A1 * | 7/2015 | Adams ................ F16K 31/1221 251/63.6 |
| 2015/0377381 A1 * | 12/2015 | King ........................ F16K 3/02 251/274 |
| 2017/0009785 A1 * | 1/2017 | McEvoy ............. F15B 15/1433 |
| 2017/0350397 A1 | 12/2017 | Coeckelbergs |

(Continued)

FOREIGN PATENT DOCUMENTS

| DE | 3336128 | 4/1984 |
| DE | 10357590 | 8/2005 |
| DE | 102008051453 | 4/2010 |

(Continued)

*Primary Examiner* — Angelisa L. Hicks
(74) *Attorney, Agent, or Firm* — Abelman, Frayne & Schwab

(57) ABSTRACT

The present invention relates to a vacuum safety valve for a vacuum pump, in particular for a rotary vane pump, comprising a housing having a flow path extending between an inlet and an outlet for a gas to be conveyed, a valve region that is disposed in the flow path and in which a valve closure element is arranged that is movable between a closed position and an open position, a control space that is associated with the valve region and in which a membrane separating the pressure side from an operating side is arranged, and a control element active between the membrane and the closure element, wherein the closure element is movable via the control element against a return force from the closed position into the open position by means of the membrane acted on at the pressure side and is movable back into the closed position on a removal of the membrane load due to the return force and is held in the closed position.

21 Claims, 4 Drawing Sheets

(56) References Cited

U.S. PATENT DOCUMENTS

2018/0266421 A1    9/2018   Coeckelbergs

FOREIGN PATENT DOCUMENTS

| GB | 1063362 | 3/1967 |
|----|---------|--------|
| JP | 2009085241 | 4/2009 |
| WO | 2016112440 | 7/2016 |
| WO | 2016112441 | 7/2016 |
| WO | 2016112442 | 7/2016 |

* cited by examiner

VACUUM SAFETY VALVE

The present invention relates to a vacuum safety valve for a vacuum pump, in particular for a rotary vane pump, and furthermore to a vacuum system comprising the vacuum safety valve, a vacuum pump, and a vacuum chamber.

Rotary vane pumps are, for example, oil-sealed rotary displacement pumps and are increasingly equipped with a vacuum safety valve. Vacuum safety valves separate the pump from the recipient as soon as a desired or unwanted standstill of the pump or another disruption occurs. The pressure level in the recipient is hereby maintained and in particular the penetration of oil or of other contaminants into the recipient is prevented.

Previously used vacuum safety valves automatically open on a falling below of a specific pressure difference—between the pressure in the recipient and the pressure in the pump. The opening of the vacuum safety valve subsequent to a closing caused by a disruption is thus solely dependent on the pressure difference. It is, however, desirable that a safe state in which the problem that led to the closing of the vacuum safety valve is remedied prior to a reopening of the vacuum safety valve. If the pressure difference is, for example, reached before the establishment of this safe state, a conventional vacuum safety valve will necessarily open even though this safe state has actually not yet been reached again. A premature opening of the valve and thus a reestablishment of the technical flow connection between the pump and the recipient in an unsafe state can have serious consequences.

It is thus the underlying object of the invention to provide a vacuum safety valve that provides increased safety.

This object is achieved by a vacuum safety valve and by a vacuum system in accordance with the respective independent claim.

The vacuum safety valve in accordance with the invention comprises a housing having a flow path extending between an inlet and an outlet for a gas to be conveyed, a valve region disposed in the flow path in which a closure element is arranged that is movable between an open position and a closed position, a control space that is associated with the valve region and in which a membrane separating a pressure side from an operating side is arranged, and a control element active between the membrane and the closure element, wherein the closure element is movable via the control element against a return force from the closed position into the open position by means of the membrane acted on at the pressure side and is movable back into the closed position on a removal of the membrane load due to the return force and is held in the closed position.

With the vacuum safety valve in accordance with the invention—also simply called a valve in the following—a return force has to be overcome for the movement of the control element from the safe closed position into the open position. This can only be achieved by a pressure application on the membrane.

The valve in accordance with the invention therefore does not automatically open—like conventional vacuum safety valves—from the falling below of a specific pressure difference between the recipient and the pump. The invention rather makes it possible, for example, to define conditions or states that are considered safe and to permit or effect a manual or automatic pressure application on the membrane. A restart of the pump can in particular be defined as a safe state and the pump itself can be used for the pressure application. The vacuum safety valve in accordance with the invention consequently provides increased safety since an unwanted opening of the valve after a closing caused by a disruption can be prevented.

Those media are also to be understood under the term "gas" that are not exclusively gaseous, but also include liquid portions such as in particular small droplets. A medium including portions of water vapor is, for example, also a gas in the sense of the present disclosure.

Advantageous embodiments of the invention are also set forth in the claims, in the following description and in the Figures.

In accordance with an embodiment, the pressure in the control space is higher at the pressure side in the open position than in the closed position. The valve can consequently be opened by increasing the pressure. It is thereby in particular not necessary to apply a vacuum to the control space to open the valve.

Alternatively or additionally, the membrane can be disposed further remote from the valve region in the closed position than in the open position.

In accordance with a further embodiment, the control space is formed in the housing and is spatially separated, in particular in a fluid-tight manner, from the valve region, in particular by at least one housing wall.

The arrangement of the control space in the housing makes a space-saving construction of the valve possible. A reliable pressure application on the membrane can be implemented by the spatial separation of the control space from the valve region without the pressure states of the control space and of the valve region mutually influencing one another.

In a further development, the control element has an elongated shape and extends in a straight line between the control space and the valve region.

In accordance with a further embodiment, the control element has a head part directly cooperating with the membrane in the region of one end and is connected to the closure element in the region of another end. The control element can be formed in one piece with the closure element. Alternatively, a separate closure element can be provided that is fastened to the control element by suitable means.

In accordance with a further embodiment, the head part is configured in ball shape and the membrane at least partly engages around the head part. A relatively large engagement surface can be presented to the membrane by the ball-like design. The membrane is in particular a diaphragm, however, other membrane types can also be used.

In accordance with a further development, the head part is of a hat-like design and a return element is partly arranged in the head part. An optimum use of the space within the control space is hereby possible and a relatively large engagement surface is simultaneously present for the membrane that is additionally separated from the return member by the head part.

In accordance with a further embodiment, a return member comprises at least one spring element, in particular a helical compression spring.

Provision can furthermore be made that a return element is arranged in the control space between a head part of the control element and a housing wall bounding the control space, in particular a housing wall separating the control space from the flow path. The return element can consequently be supported at the housing wall. The separation of the control space from the flow path by means of the housing wall can be configured as gas-tight here; however, this is not absolutely necessary.

A head part of the control element preferably contacts a housing wall bounding the control space, in particular a housing wall separating the control space from the flow path, in the open position. The housing wall can hereby serve as an end abutment for the head part and thus for the control element, whereby the maximum travel for the closure element and thus the open position of the valve can be exactly defined.

In accordance with a further embodiment, the flow path is formed by a flow passage extending between the inlet and the outlet, with the inlet and the outlet not being disposed on a straight line extending through the flow passage and/or with the flow path having at least two passage sections having non-coinciding longitudinal axes. Such a flow path enables a transmission of the membrane movement to the closure element by means of the control element in a simple manner in a construction respect. It is in particular hereby possible to use a control element of a comparatively simple design. e.g. provided in the form of a straight bar. The control element starting from the control space preferably extends through a part of the flow passage, in particular past the one passage section to the valve region disposed in the other passage section.

In accordance with a further embodiment, the passage sections are each provided in the form of a bore formed in the housing, with the bores preferably each starting from an outer side of the housing and with the one bore forming the inlet and the other bore forming the outlet.

Provision can furthermore be made that the valve region is disposed at a transition between two sections of the flow path having flow cross-sections of different sizes, with the control element extending through at least a part of the narrower section to the closure element and with the closure element being arranged in the wider section and closing the opening of the narrower section into the wider section in the closed position.

Such a transition between the passage sections having different cross-sectional sizes can be reliably sealed by a closure element having a comparatively simple form, e.g. by a closure element in the form of a cylindrical disk.

In the vacuum system in accordance with the invention that comprises at least one vacuum pump, at least one vacuum chamber, and at least one vacuum safety valve in accordance with the invention, the valve inlet is associated with the vacuum chamber and the valve outlet is associated with the vacuum pump.

In accordance with an embodiment, the pressure side of the control space is connected to a pressure source, in particular to a hydraulic pressure source, of the vacuum pump, in particular while bypassing the membrane and/or the control element, with the pressure source being operable such that on a pump operation of the vacuum pump in accordance with its intended purpose, the membrane is acted on and the open position of the valve is maintained and in the event of a disruption to the pump operation or after the switching off of the vacuum pump the action on the membrane is removed.

A pressure source of the vacuum pump that is anyway present can here be used in an advantageous manner to apply pressure to the membrane. The valve in particular opens automatically when a restart of the vacuum pump is considered as a safe state subsequent to a proper or disruption-induced interruption of the pump operation since the pressure source, for example an integrated hydraulic pump of the vacuum pump, also returns to operation on the restart of the pump and the membrane is thus again acted on.

In accordance with a possible embodiment of the system, an external configuration having a vacuum safety valve arranged outside the vacuum pump is provided.

Alternatively, an internal configuration is provided in which the vacuum safety valve or a housing of the vacuum safety valve is arranged within a vacuum pump housing of the vacuum pump or forms a part of the vacuum pump housing or is at least partly formed by the vacuum pump housing.

The housing of the vacuum safety valve can be configured such that the valve can be used both in an external configuration and in an internal configuration. Provision is preferably made that in the external or internal configuration, at least a housing opening associated with the control space or with the flow path is formed by a remote end element releasably connected to the housing in the internal and/or external configuration.

A more flexible, more universal use of the vacuum safety valve in different vacuum systems is possible due to the two possible configurations.

The housing can be adapted to the respective desired configuration by the end element. The end element can in particular be formed as an adapter that makes it possible to adapt the housing to the respective connection situation present. In an external configuration, for example, the end element can enable the connection of the pressure side of the control space to a pressure connection of the vacuum pump that is not possible or is not required with an internal configuration when the housing opening of the valve can be directly connected to the pressure source of the vacuum pump. The end element can furthermore serve for the reception of a flange element which can in particular be screwed in and unscrewed and via which the vacuum pump can be connected to a housing opening forming the outlet of the valve in the external configuration.

The invention will be described in the following only by way of example with reference to the drawing.

Figure 1:
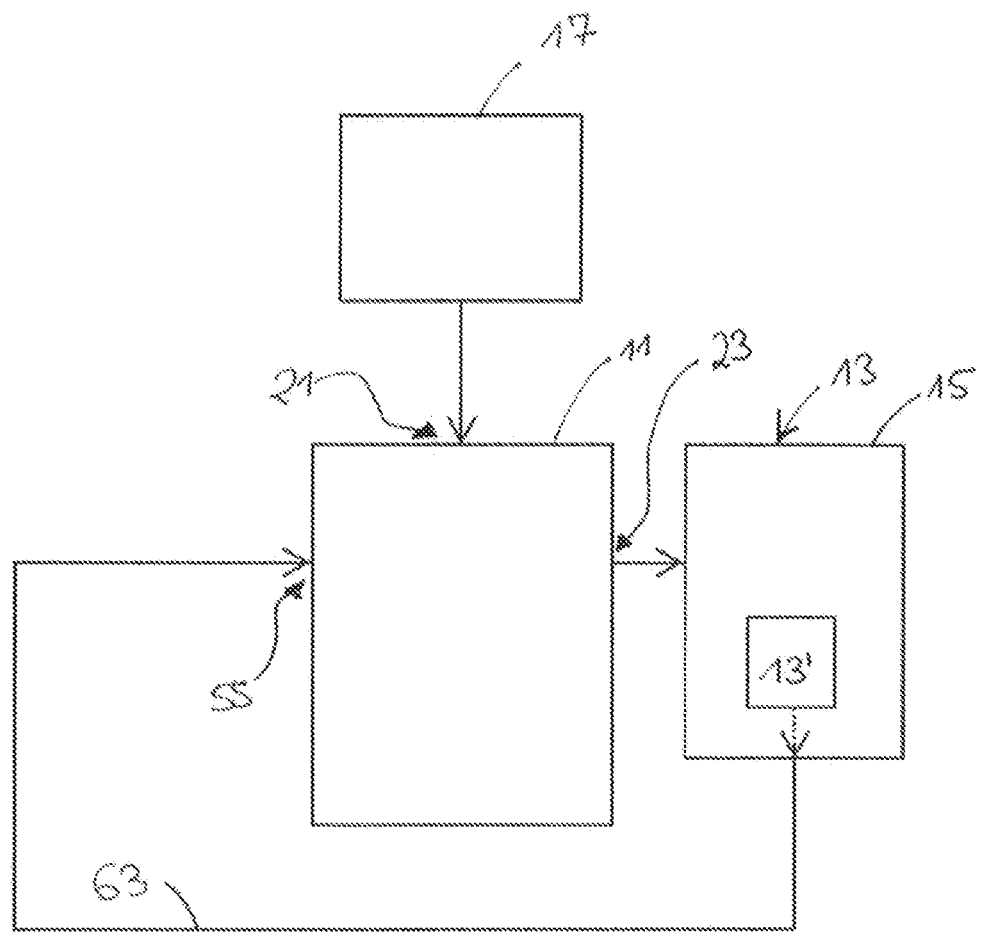
FIG. 1 shows a vacuum system in accordance with the invention with a vacuum pump, a vacuum chamber, and a vacuum safety valve in accordance with the invention in an external configuration.

A vacuum system is shown in FIG. 1. It comprises a vacuum safety valve 11, a vacuum pump 13, a pressure source 13' arranged in the vacuum pump 13, and a vacuum chamber 17 that is called a recipient and that is to be evacuated by means of the pump 13. The vacuum pump 13 and the pressure source 13' are arranged in a vacuum pump housing 15. The vacuum safety valve 11 is shown in an external configuration, i.e. the valve 11 is outside the housing 15 and is connected to the vacuum chamber 17 via an inlet 21 and to the vacuum pump 13 via an outlet 23. The pressure source 13' arranged within the vacuum pump 13 is connected to the vacuum safety valve 11 via an external pressure line 63 and via a pressure connector element 55.

Figure 2:
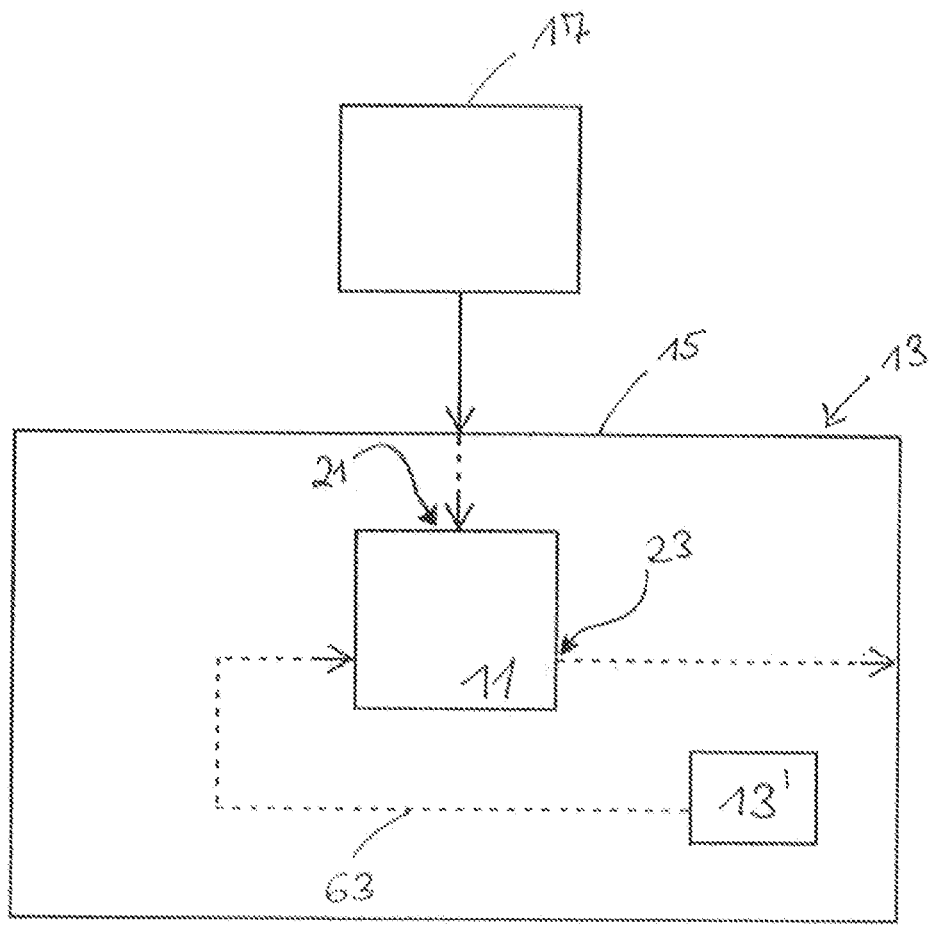
FIG. 2 shows a vacuum system in accordance with the invention with a vacuum pump, a vacuum chamber, and a vacuum safety valve in accordance with the invention in an internal configuration.

A further vacuum system is shown in FIG. 2. It likewise comprises a vacuum safety valve 11, a vacuum pump 13, a pressure source 13', a vacuum pump housing 15, and a vacuum chamber 17. The representation shows an internal configuration of the vacuum safety valve 11, i.e. the valve 11 is inside the pump housing 15 and the vacuum chamber 17 is connected to the inlet 21 of the valve 11 via the vacuum pump housing 15. The pressure source 13' is connected to the valve 11 via an internal pressure line 63. The outlet 23 of the valve 11 is connected to the gas inlet of a pump system, not shown, of the vacuum pump 13.

Figure 3:
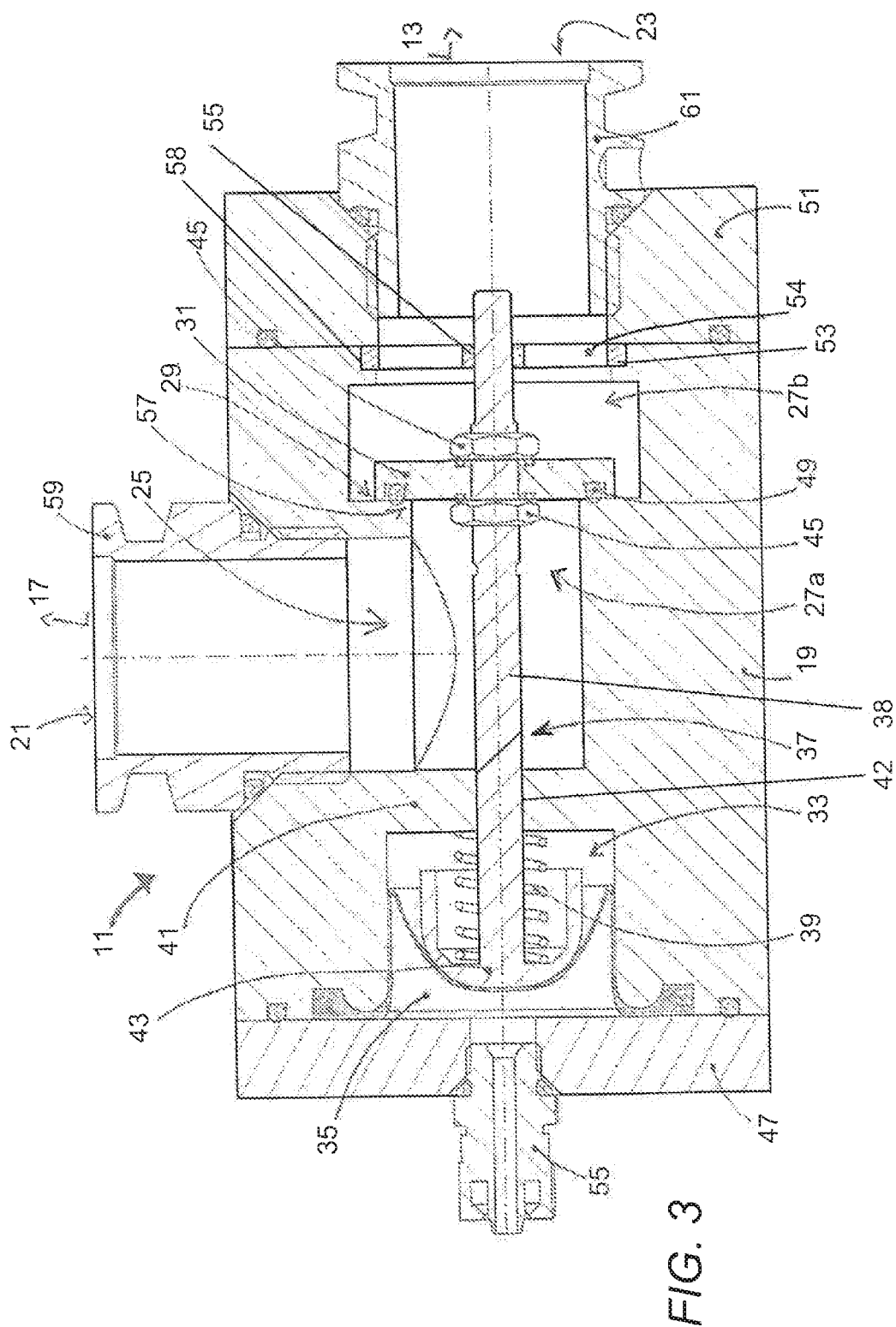
FIG. 3 shows an embodiment of a vacuum safety valve in accordance with the invention in the closed position.
Figure 4:
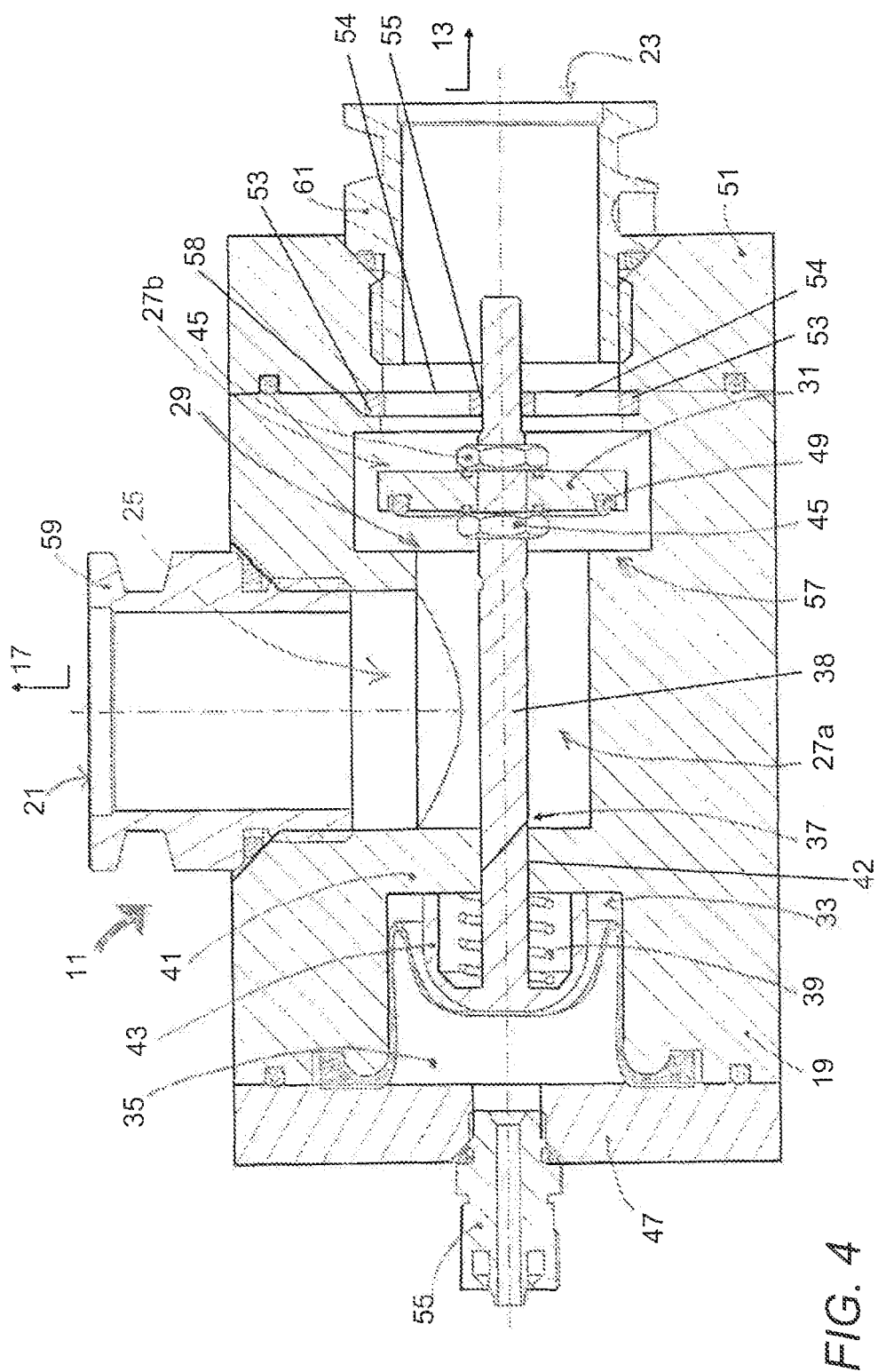
FIG. 4 shows the vacuum safety valve of FIG. 3 in the open position.

The embodiment of a vacuum safety valve 11 in accordance with the invention described in the following with reference to FIGS. 3 and 4 is inter alia characterized in that it can be used both in an external configuration in accordance with FIG. 1 and in an internal configuration in accordance with FIG. 2.

The valve 11 is respectively shown in cross-section in FIGS. 3 and 4, with the valve being closed in FIG. 3 and being open in FIG. 4.

The valve 11 comprises a parallelepiped-shaped housing 19. The connections to the vacuum chamber 17 and to the vacuum pump 13 are indicated. The inlet 21 and the outlet 23 of the valve 11 are each implemented by a bore in the housing 19. A flange element 59 serving for the connection to the chamber 17 is screwed into the bore at the inlet side.

The inlet 21 opens into a passage section 25 that merges into a passage section 27a, 27b leading to the outlet 23 and extending at a right angle to the passage section 25, said passage section 27a, 27b comprising a narrower section 27a adjoining the passage section 25 and a wider section 27b forming a housing opening. This housing opening at the outlet side is closed by means of an end element 51 into which a flange element 61 is screwed that serves for the connection to the pump 13.

The passage section 25 and the passage section 27a, 27b form a flow path from the inlet 21 to the outlet 23. A valve region 29 is located in this flow path and has a closure element 31 that is positioned in the transition between the narrower section 27a and the wider section 27b and that is designed as a valve disk. The closure element 31 is here located in the wider section 27b and its side remote from the outlet 23 contacts a shoulder 57 of the housing 19 forming the transition with the interposition of an O ring seal 49 in the closed position shown here. Various seal elements can be used instead of the O ring seal 49 shown. The sealing element can also be configured as a flat seal, for example.

The closure element 31 is fastened to an elongated shaft 38 of the control element 37 and is fixed in the longitudinal direction of the control element 37 by two securing rings 45. The control element 37 extends from a bearing element 53 arranged at the outlet side in the housing 19 through the wider section 27b, the closure element 31, the narrower section 27a, and a housing wall 41 into a control space 33 formed in the housing 19. The housing wall 41 separates the control space 33 from the valve region 29.

The bar-shaped shaft 38 of the control element 37 is held and guided in a centering manner at a distal end towards the outlet 23 by the disk-shaped bearing element 53, which is supported at the outlet side in a front-side peripheral cut-out 58 of the housing 19 and has a central opening 55 for receiving the shaft 38 of the control element 37, and at a proximal end of the shaft 38 by an opening 42 extending through the housing wall 41.

A membrane 35 is arranged in the control space 33 and separates a pressure side from an operating side of the control space 33 in a fluid-tight manner. The membrane 35 is fixed at the housing 19 at the pressure side and is arranged for this purpose with a bead region bounding an inlet opening of the membrane 35 in a peripheral groove formed at the front side in the housing 19. A region of the membrane 35 radially inwardly bounding the bead section is clamped between the front housing side and an end element in the form of a cover 47.

The control element 37 has a hat-shaped head part 43 at its end located in the control space 33. A helical compression spring 39 serving as a return element is arranged within the head part 43 and on the control element 37. The helical compression spring 39 is partly surrounded by the head part 43 in the closed position shown here and extends between the base of the head part 43 and the housing wall 41.

The membrane 35 contacts the ball-shaped outer surface of the head part 43 at the operating side. The part of the control space 33 at the pressure side is bounded by the membrane 35, the housing 19, and the cover 47. A pressure connector element 55 is screwed into an opening of the cover 47 and can be connected to a pressure line to be able to connect the pressure side of the control space 33 to e.g. a pressure source of a vacuum pump (cf. FIG. 1).

The vacuum safety valve 11 is shown in the open position in FIG. 4 in which the membrane 35 has undergone an application of pressure by hydraulic oil flowing in via the pressure connector element 55 and has become deformed. The control element 37 is hereby acted on at its head part 43 and moves in the direction of the valve region 29—that is to the right in FIGS. 3 and 4—until the head part 43 contacts the housing wall 41. The helical compression spring 39 is compressed.

The closure element 31 attached to the control element 37 in the valve region 29 rises from its valve seat formed by the shoulder 57 of the housing 19 by this control movement taking place against the return force of the spring 39. The flow path from the inlet 21 to the outlet 23 is no longer interrupted by the closure element 31. The valve 11 is open and an opening 54 formed through the bearing 53 allows the fluid that enters the wider section 27b from the inlet valve 21 and passage section 27a to flow into the valve outlet 23, as shown in FIG. 4. That is, in the open position of the closure element 31, the flow path extends through the inlet 21, the valve region 29, the bearing 53 and the outlet 23.

As already mentioned, FIGS. 3 and 4 show the valve 11 in a configuration with the covers 47, 51 and the flange elements 59, 61 that is designed for an external use outside the vacuum pump (cf. e.g. FIG. 1). In an internal configuration, the covers 47, 51 and the flange elements 59, 61 are not required since the valve 11 can be integrated in the superstructure of the vacuum pump. Depending on the specific design of the valve 11 and of the vacuum pump, the housing 19 and the functional components such as in particular the membrane 35, the control element 37 together with the spring 39 and the valve disk 31 having securing rings 45 and the sealing element 49, and the bearing element 53 can be maintained in unchanged form for the internal use or a differently designed valve that, however, has the same functional effect can be used. It is also possible to completely or partly dispense with a separate valve housing and to integrate at least some of the functional parts in the pump housing.

As already mentioned in the introduction part, a particularly advantageous usage option for the safety valve in accordance with the invention comprises the pressure side of the control space 33 being connected to a pressure source, anyway present, of a vacuum pump, e.g. to a hydraulic pump of a rotary vane pump. Independently of whether an external (e.g. FIG. 1) or an internal (e.g. FIG. 2) configuration is implemented, a vacuum pump running in accordance with its intended purpose consequently itself provides a sufficiently high pressure for acting on the valve membrane 35 and thus to hold the valve 11 open due to the then likewise working hydraulic pump. This pressure drops when the vacuum pump stops in a desired or unwanted manner so that the valve 11 automatically closes in this unsafe state. The valve 11 only opens again when the pressure on the pressure side of the membrane 35 is sufficiently high. This is equivalent to a working hydraulic pump and thus to a vacuum pump working in accordance with its intended purpose, i.e. to a safe state.

In accordance with the invention, situations can consequently not occur in which the valve 11 opens because a condition is satisfied that does not necessarily mean a safe state. The behavior of the valve 11 in accordance with the invention is in particular independent of the pressure difference between the vacuum chamber (recipient) and the vacuum pump.

A further advantage of the valve 11 in accordance with the invention comprises the valve disk 31 not only being pressed against its valve seat by the spring 39, but additionally by the pressure difference between the valve inlet 21 connected to the at least partly evacuated vacuum chamber and the valve outlet 23 at atmospheric pressure with a flooded vacuum pump and thus a closed valve 21 and the contact pressure on the seal element 49 of the valve disk 31 thus being increased.

REFERENCE NUMERAL LIST

11 vacuum safety valve
13 vacuum pump
13' pressure source
15 vacuum pump housing
17 vacuum chamber
19 housing
21 inlet
23 outlet
25 passage section
27a narrower section
27b wider section
29 valve region
31 closure element, valve disk
33 control space
35 membrane
37 control element
39 return member, spring element, helical compression spring
41 housing wall
43 head part
45 securing ring
47 end element
49 sealing element
51 end element
53 bearing element
55 pressure connector element
57 shoulder
59 flange element
61 flange element
63 pressure line

The invention claimed is:

1. A vacuum safety valve for a vacuum pump, the vacuum safety valve comprising:
a housing having a flow path extending between an inlet and an outlet for a gas to be conveyed;
a valve region that is disposed in the flow path and in which a closure element is arranged that is movable between a closed position and an open position;
a control space that is associated with the valve region and in which a membrane is arranged that separates a pressure side from an operating side;
a housing wall positioned in the housing that spatially separates and makes fluidly impermeable the control space from the valve region;
a control element having an elongated, solid shaft which extends between the membrane and the closure element, wherein the closure element is movable via the control element against a return force from the closed position into the open position by the membrane being acted on at the pressure side, the closure element being movable back into the closed position and held in the closed position by the return force when an applied force on the membrane is removed; and
wherein the housing wall supports a first end of the shaft within the control space proximate the inlet, a bearing having a fluid opening supports and guides an opposing end of the shaft proximate the outlet such that the housing wall and the bearing are positioned on opposing sides of the closure element and, wherein in the open position of the closure element, the flow path extends through the inlet, the valve region, the bearing and the outlet.

2. The vacuum safety valve in accordance with claim 1, wherein the pressure at the pressure side in the control space is higher in the open position than in the closed position.

3. The vacuum safety valve in accordance with claim 1, wherein the membrane is disposed further remote from the valve region in the closed position than in the open position.

4. The vacuum safety valve in accordance with claim 1, wherein the control element extends in a straight line between the control space and the valve region.

5. The vacuum safety valve in accordance with claim 1, wherein the control element has a head part directly cooperating with the membrane which is positioned proximate a first end of the housing and is connected to the closure element positioned proximate a second end of the housing.

6. The vacuum safety valve in accordance with claim 5, wherein the control element is formed in one piece with the closure element.

7. The vacuum safety valve in accordance with claim 5, wherein the head part is configured with a curved portion and the membrane at least partly engages around the curved portion of the head part.

8. The vacuum safety valve in accordance with claim 5, wherein the head part is of hat shape and a return element is partly arranged in the head part.

9. The vacuum safety valve in accordance with claim 1, wherein a return element comprises at least one spring element.

10. The vacuum safety valve in accordance with claim 1, wherein a return element is arranged in the control space between a head part of the control element and a housing wall bounding the control space.

11. The vacuum safety valve in accordance with claim 1, wherein the flow path is formed by a flow passage extending between the inlet and the outlet, with the inlet and the outlet not being disposed on a straight line extending through the flow passage.

12. The vacuum safety valve in accordance with claim 1, wherein the flow passage has at least two passage sections having non-coinciding longitudinal axes.

13. The vacuum safety valve in accordance with claim 12, wherein the passage sections are each provided in the form of a bore formed in the housing.

14. The vacuum safety valve in accordance with claim 13, wherein the bores each start from an outer side of the housing and with the one bore forming the inlet and the other bore forming the outlet.

15. The vacuum safety valve in accordance with claim 1, wherein the valve region is disposed at a transition between two sections of the flow path having flow cross-sections of different sizes, with the control element extending through at least a part of the narrower section to the closure element and with the closure element being arranged in the wider section and closing the opening of the narrower section into the wider section in the closed position.

16. The vacuum system in accordance with claim 1, wherein the bearing is a disc-shaped bearing having a central opening for receiving the opposing end of the shaft.

17. A vacuum system having a vacuum pump, a vacuum chamber, and a vacuum safety valve, the vacuum safety valve comprising:
a housing having a flow path extending between a valve inlet and a valve outlet for a gas to be conveyed;
a valve region that is disposed in the flow path and in which a closure element is arranged that is movable between a closed position and an open position;
a control space that is associated with the valve region and in which a membrane is arranged that separates a pressure side from an operating side;
a wall positioned in the housing that spatially separates and makes fluidly impermeable the control space from the valve region;
a control element having an elongated, solid shaft which extends between the membrane and the closure element, wherein the closure element is movable via the control element against a return force from the closed position into the open position by the membrane being acted on at the pressure side, the closure element being movable back into the closed position and is held in the closed position by the return force when an applied force on the membrane is removed,
wherein the valve inlet is associated with the vacuum chamber and the valve outlet is associated with the vacuum pump; and
wherein the housing wall supports a first end of the shaft within the control space proximate the inlet, and a bearing supports and guides an opposing end of the shaft proximate the valve outlet such that the housing wall and the bearing are positioned on opposing sides of the closure element, and wherein the bearing has a fluid opening and, in the open position of the closure element, the flow path extends through the valve inlet, the valve region, the bearing and the valve outlet.

18. The vacuum system in accordance with claim 17, wherein the pressure side of the control space is connected to a pressure source from the vacuum pump, with the pressure source being operable such that on a pump operation of the vacuum pump the membrane is acted on and the open position of the valve is maintained, and in the event of a disruption to the pump operation or after the switching off of the vacuum pump the action on the membrane is removed.

19. The vacuum system in accordance with claim 17, wherein an external configuration having a vacuum safety valve arranged outside the vacuum pump is provided or an internal configuration is provided in which the vacuum safety valve or a housing of the vacuum safety valve is arranged within a vacuum pump housing of the vacuum pump or forms a part of the vacuum pump housing or is at least partly formed by the vacuum pump housing; and
wherein the housing of the vacuum safety valve can be used both in an external configuration and in an internal configuration, with at least one housing opening associated with the control space or with the flow path being formed in the external configuration by an end element which in the internal configuration is remote and is releasably connected to the housing.

20. A vacuum safety valve for a vacuum pump, the vacuum safety valve comprising:
a housing having a flow path extending between an inlet and an outlet for a gas to be conveyed;
a valve region that is disposed in the flow path and in which a closure element arranged that is movable between a closed position and an open position;
a control space that is associated with the valve region and in which a membrane is arranged that separates a pressure side from an operating side;
a housing wall positioned in the housing that spatially separates and makes fluidly impermeable the control space from the valve region;
a control element having an elongated, solid shaft which extends between the membrane and the closure element, wherein the closure element is movable via the control element against a return force from the closed position into the open position by the membrane being acted on at the pressure side, the closure element being movable back into the closed position and held in the closed position by the return force when an applied force on the membrane is removed, the control element including a head part directly cooperating with the membrane which is positioned proximate a first end of the housing and is connected to the closure element positioned proximate a second end of the housing, the head part being cylindrical and having a closed first end with a curved portion and an open second end configured to engage the housing wall within the control space in the open position, the membrane at least partly engaging around the curved first end of the head part; and
wherein the housing wall supports a first end of the shaft within the control space and a bearing supports and guides an opposing end of the shaft proximate the outlet, such that the housing wall and the bearing are positioned on opposing sides of the closure element.

21. A vacuum safety valve of claim 20, wherein the control space further comprises a coiled spring having a coiled shape that circumscribes the shaft and is positioned at least within the open second end of the head part, the coiled-shaped spring having a first end arranged against an interior portion of the first end of the head part and a second end arranged against the housing wall.

\* \* \* \* \*